US012466198B2

(12) United States Patent
Ueno et al.

(10) Patent No.: US 12,466,198 B2
(45) Date of Patent: Nov. 11, 2025

(54) LIQUID DISCHARGE APPARATUS

(71) Applicants: Satoshi Ueno, Tokyo (JP); Muneyuki Okeguchi, Kanagawa (JP)

(72) Inventors: Satoshi Ueno, Tokyo (JP); Muneyuki Okeguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 159 days.

(21) Appl. No.: 18/368,020

(22) Filed: Sep. 14, 2023

(65) Prior Publication Data

US 2024/0092092 A1 Mar. 21, 2024

(30) Foreign Application Priority Data

Sep. 15, 2022 (JP) ................................ 2022-147012
Aug. 2, 2023 (JP) ................................ 2023-126126

(51) Int. Cl.

| | |
|---|---|
| ***B41J 11/00*** | (2006.01) |
| ***B41J 2/21*** | (2006.01) |
| ***B41J 3/407*** | (2006.01) |
| ***B41J 29/387*** | (2006.01) |
| ***B41M 5/00*** | (2006.01) |
| *D06P 5/30* | (2006.01) |

(52) U.S. Cl.

CPC ........... *B41J 3/4078* (2013.01); *B41J 2/2114* (2013.01); *B41J 29/387* (2013.01); *B41M 5/0017* (2013.01); *D06P 5/30* (2013.01)

(58) Field of Classification Search

CPC ........................... B41J 11/0015; B41M 5/0017
See application file for complete search history.

(56) References Cited

U.S. PATENT DOCUMENTS

2017/0015113 A1* 1/2017 Yamashita ............... B41J 11/06
2017/0136784 A1 5/2017 Ueno
2018/0154656 A1 6/2018 Ueno et al.
2020/0290370 A1 9/2020 Ueno
2020/0298591 A1 9/2020 Ueno et al.
2021/0237467 A1 8/2021 Kemma et al.

FOREIGN PATENT DOCUMENTS

JP 2015-183339 A 10/2015
JP 2019-025668 A 2/2019
JP 2020-151892 A 9/2020
WO 2015/146182 A1 10/2015

OTHER PUBLICATIONS

European Search Report issued Feb. 16, 2024 in European Patent Application No. 23196733.2, 12 pages.

* cited by examiner

*Primary Examiner* — Scott A Richmond
(74) *Attorney, Agent, or Firm* — XSENSUS LLP

(57) ABSTRACT

A liquid discharge apparatus includes a holder, a pre-treatment head, a smoother, and a print head. The holder reciprocally moves while holding a recording medium. The pre-treatment head discharges a pre-treatment liquid onto a surface of the recording medium held by the holder. The smoother smooths the pre-treatment liquid, which is discharged onto the surface of the recording medium, along the surface of the recording medium by a movement of the holder. The print head discharges a printing liquid onto the surface of the recording medium with the pre-treatment liquid smoothed.

20 Claims, 8 Drawing Sheets

LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-147012 and No. 2023-126126, each filed on Sep. 15, 2022 and Aug. 2, 2023, respectively, in the Japan Patent Office, the entire disclosure of Which is hereby incorporated 1*w* reference herein.

BACKGROUND

Technical Field

Embodiments of the present disclosure relate to a liquid discharge apparatus.

Related Art

A liquid discharge apparatus such as an inkjet printer can form a high-quality image equivalent to the image quality formed by analog printers not only on a general sheet of paper but also on a hardly permeable medium such as coated paper, a non-absorbent medium such as a plastic film, and a fabric such as a woven fabric or a knitted fabric depending on the model of the liquid discharge apparatus. A model of the liquid discharge apparatus that is capable of printing on a sewn garment may be referred to as a garment printer or a direct-to-garment (DTG) printer.

A liquid discharge apparatus is known in which a platen is moved to perform printing on a print medium including a fabric. When such a liquid discharge apparatus performs printing on a fabric with ink, a pre-treatment liquid may be applied to the fabric in advance. Depending on the kind of the fabric, preferably, a pre-treatment liquid may be used to cause colors to appear more clearly or patterns to stand out more distinctively.

Alternatively, depending on the print medium, preferably, a pre-treatment liquid that has been applied to the print medium is smoothed typically for the purpose of preventing fluffing.

SUMMARY

In an embodiment of the present disclosure, a liquid discharge apparatus includes a holder, a pre-treatment head, a smoother, and a print head. The holder reciprocally moves while holding a recording medium. The pre-treatment head discharges a pre-treatment liquid onto a surface of the recording medium held by the holder. The smoother smooths the pre-treatment liquid, which is discharged onto the surface of the recording medium, along the surface of the recording medium by a movement of the holder. The print head discharges a printing liquid onto the surface of the recording medium with the pre-treatment liquid smoothed.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
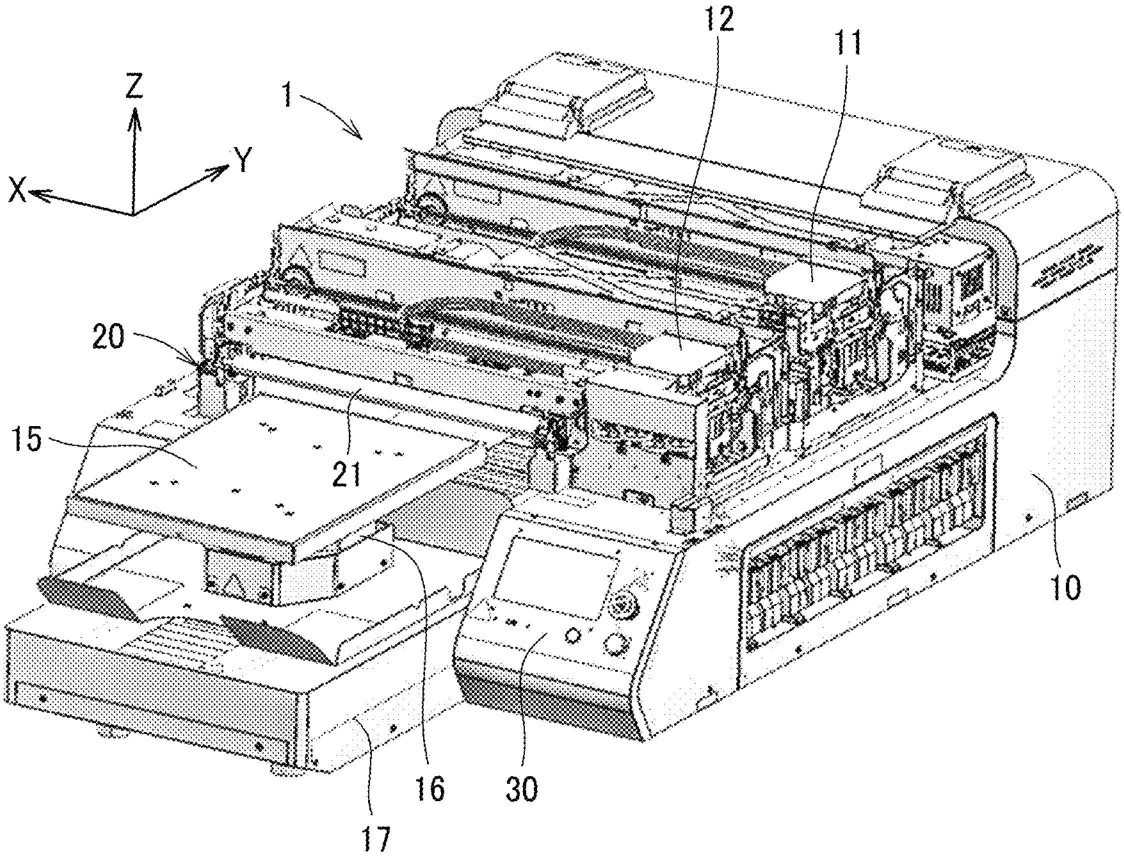
FIG. 1 is a perspective view of a liquid discharge apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Schematic Configuration of Liquid Discharge Apparatus

A liquid discharge apparatus according to embodiments of the present disclosure is described with reference to the drawings below. Embodiments of the present disclosure are not limited to embodiments described below and can be changed within the scope of the present disclosure that can be conceived of by those skilled in the art, such as additions, modifications, and deletions of other embodiments. The scope of the present disclosure encompasses any aspects, as long as the aspects achieve the functions and effects of the present disclosure.

Figure 2A:
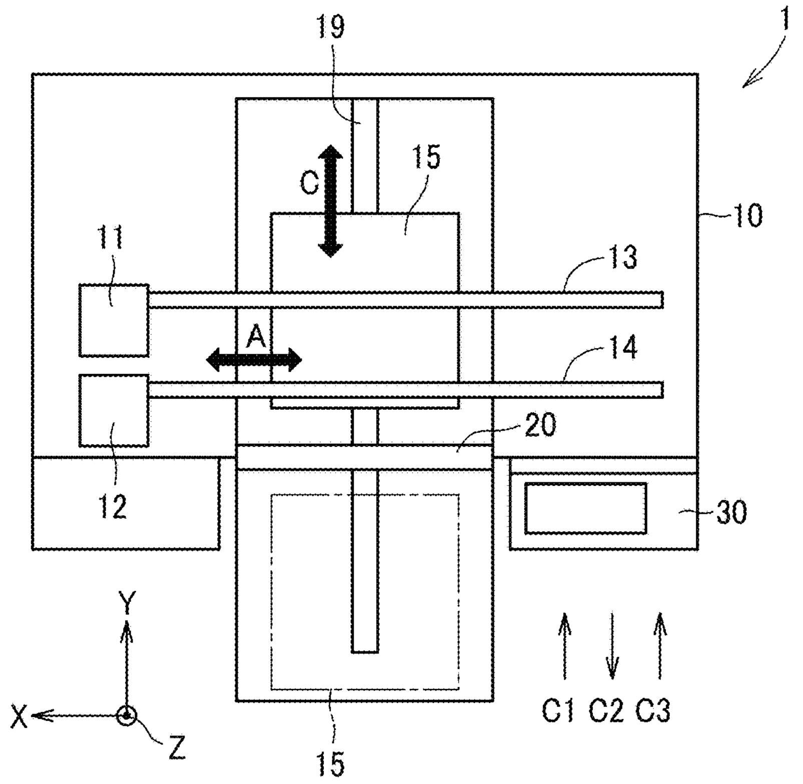
FIG. 2A is a schematic plan view of the liquid discharge apparatus of FIG. 1.
Figure 2B:
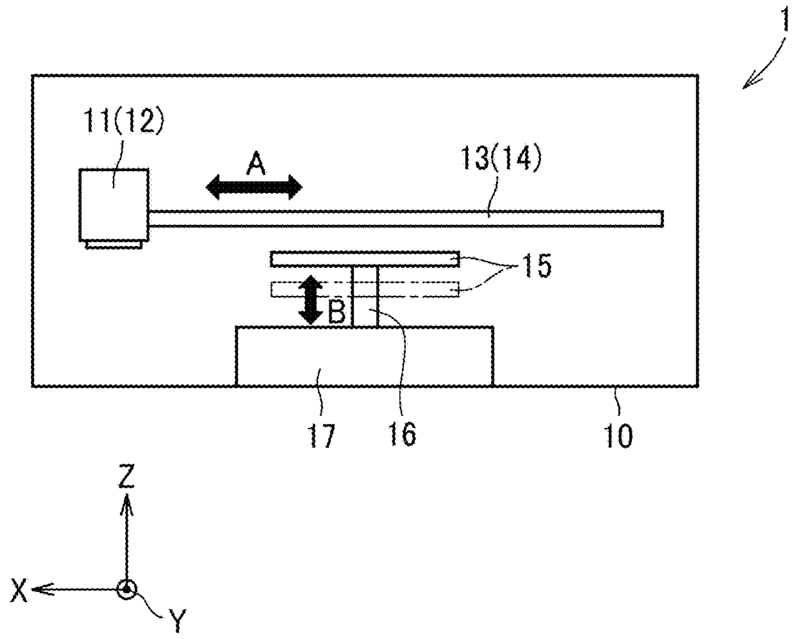
FIG. 2B is a schematic cross-sectional view of the liquid discharge apparatus of FIG. 2A.
Figure 3:
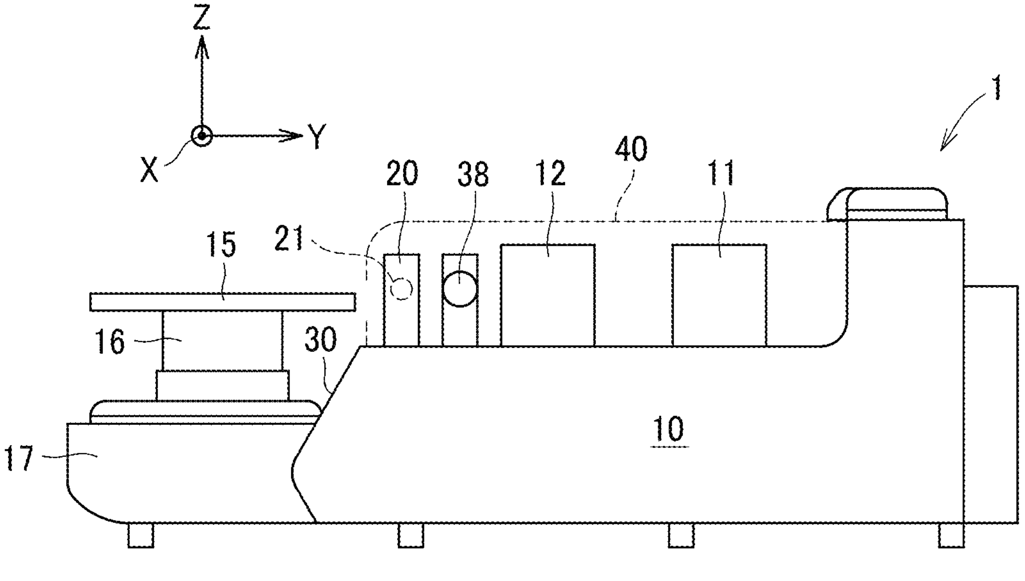
FIG. 3 is a side view of the liquid discharge apparatus of FIG. 1.

FIG. 1 is a perspective view of a liquid discharge apparatus 1 according to an embodiment of the present disclosure. FIG. 2A is a schematic plan view of the liquid discharge apparatus 1. FIG. 2B is a schematic cross-sectional view of the liquid discharge apparatus 1. FIG. 3 is a side view of the liquid discharge apparatus 1. As illustrated in FIG. 1, a rectangular plate-shaped holder 15, which is also referred to as a platen in the following description, that mounts and holds a recording medium or recording media is disposed on the front side of the liquid discharge apparatus 1. The size, for example, of the holder 15 can be changed as appropriate.

Examples of the recording medium are not limited to recording media employed as typical recording media, such as plain paper, glossy paper, and special paper. However, building materials such as wall sheets, flooring materials, and tiles, fabrics for clothing products such as T-shirts, textiles, and leather may be employed as the recording medium as appropriate. In addition, for example, ceramics, glass, or metal can be employed as the recording medium by adjusting the configuration of a path through which the recording medium is conveyed.

Further, a non-permeable base material may be employed as the recording medium to form a favorable quality image. The non-permeable base materials refer to base materials having a surface with low water permeability and low water absorption and include a base material that does not include openings leading to the outside even if the base material includes multiple cavities. More quantitatively, the non-permeable base materials refer to base materials in which the amount of water absorption from the start of contact to 30 $msec^{1/2}$ is equal to or smaller than 10 $mL/m^2$ when measured in the Bristow method. As the non-permeable base material, for example, a plastic film such as a vinyl chloride resin film, a polyethylene terephthalate (PET) film, polypropylene film, polyethylene film, or a polycarbonate film may be employed as needed.

A center portion of the lower surface of the holder 15 is supported by a holder moving table 17 via a columnar support 16. A driver that serves as a second lifter for moving the holder 15 in the vertical direction as illustrated in FIG. 2B, i.e., directions indicated by arrow 7, is incorporated in the holder moving table 17. The holder 15 is vertically movable in directions indicated by arrow B in FIG. 2B by the driver.

As illustrated in FIG. 2A, a pre-treatment head 11 and a print head 12 are disposed in a central portion of an apparatus body 10 in a front-rear direction of the apparatus body 10, which is a direction indicated by arrow Y. The direction indicated by arrow Y may also be referred to simply as Y direction in the following description. The pre-treatment head 11 includes inkjet nozzles to apply a pre-treatment liquid to the surface of the recording medium. The print head 12 includes inkjet nozzles to apply ink for printing to the surface of the recording medium. A smoother assembly 20 to be described below is disposed upstream from the print head 12 in the front-rear direction of the apparatus body 10.

As illustrated in FIGS. 2A and 2B, the pre-treatment head 11 and the print head 12 are reciprocally movable in directions indicated by arrow A along guide rails 13 and 14, respectively. The guide rails 13 and 14 are disposed along the left-right direction, which is a direction indicated by arrow X, of the apparatus body 10. The direction indicated by arrow X may also be referred to simply as X direction in the following description. In FIGS. 2A and 2B, the guide rail 13 that guides the pre-treatment head 11 is disposed in a rear portion of the apparatus body 10, and the guide rail 14 that guides the print head 12 is disposed in a front portion of the apparatus body 10 upstream from the guide rail 13 in the front-rear direction of the apparatus body 10.

The holder 15 is movable in directions indicated by arrow C in FIG. 2A along a guide rail 19 disposed in the front-rear direction of the apparatus body 10. The front-rear direction of the apparatus body 10 may also be referred to simply as Y direction or a first direction in the following description. The guide rail 19 that extends in the Y direction is disposed at a right angle to the guide rails 13 and 14 extending in the X direction. The upper surface of the holder 15 on which the recording medium is placed is a plane defined by the X direction and the Y direction.

The direction in which the pre-treatment head 11 and the printing head 12 move may be referred to as a main-scanning direction in the following description. The direction in which the holder 15 moves may also be referred to as a sub-scanning direction in the following description.

Smoother Assembly

The smoother assembly 20 is described below with reference to FIGS. 4A, 4B, 4C, and 4D. The smoother assembly 20 is disposed upstream from the print head 12 in the front-rear direction of the apparatus body 10, upstream from the holder 15 in a direction in which the holder 15 moves from the front side to the rear side of the apparatus body 10. In other words, the smoother assembly 20 is disposed at an end of the front portion of the apparatus body 10 as illustrated in FIG. 3. The smoother assembly 20 contacts the recording medium for a long period of time. Thus, frequent maintenance of the smoother assembly 20 is necessary. Accordingly, the smoother assembly 20 is disposed at the end of the front portion of the apparatus body 10 at which access to the smoother assembly 20 is relatively easy.

The smoother assembly 20 includes a body frame 20*a*, which extends in a width direction of the liquid discharge apparatus 1, i.e., the X direction and the second direction, a smoothing roller 21 as a smoother, a smoothing-roller lift sensing member 22 as a lift sensing member, an interlock switch 23, and a pair of right and left electromagnetic solenoids 24 as first lifters. In FIGS. 4A, 4B, 4C, and 4D, a direction perpendicular to the first direction, i.e., the Y direction, is the second direction, i.e., the X direction. A shaft 21*a* is rotatable supported by a pair of right and left shaft supports 21*b* at both ends of the smoothing roller 21 in the longitudinal direction.

The smoothing roller 21 is formed by assembling a cylindrical elastic body around a core metal integral with the shaft 21*a* as a single component. The holder 15 is moved in the directions indicated by arrow C in FIG. 2A while the smoothing roller 21 contacts the surface of a recording medium such as a fabric, which is a printing target, placed on the holder 15. By so doing, the pre-treatment liquid that has been applied to the surface of the recording medium by the pre-treatment head 11 can be smoothed in the Y direction. Instead of the smoothing roller 21, a smoother such as a smoothing blade may be employed.

Figure 4A:
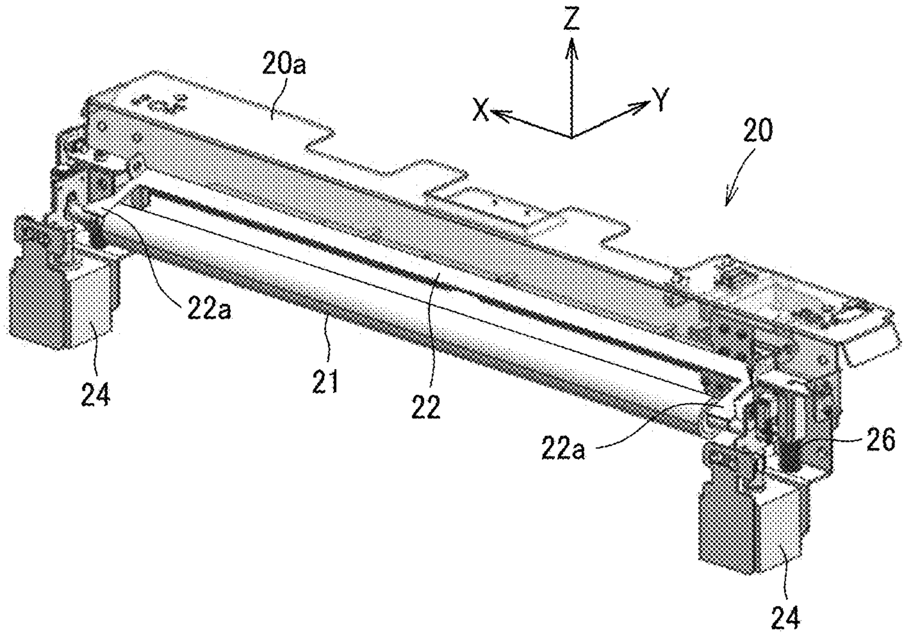
FIG. 4A is a perspective view of a smoother assembly according to an embodiment of the present disclosure.
Figure 4B:
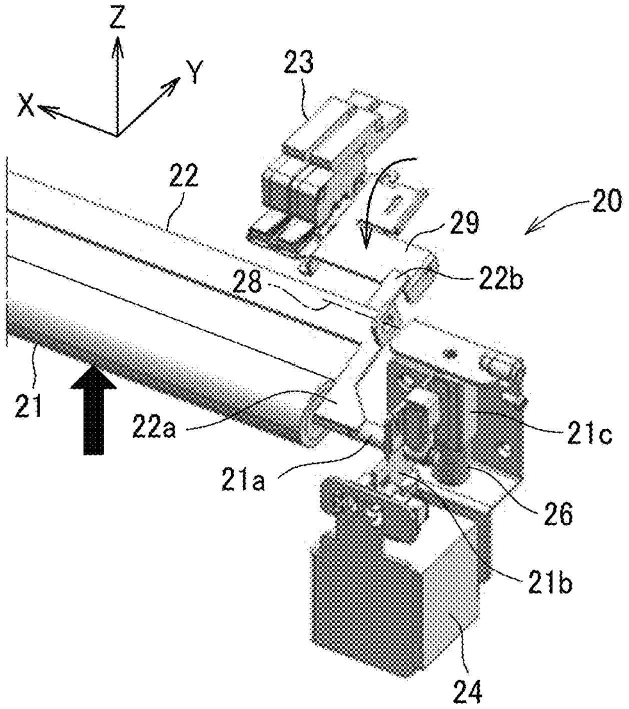
FIG. 4B is an enlarged perspective view of one end of the smoother assembly of FIG. 4A.
Figure 4C:
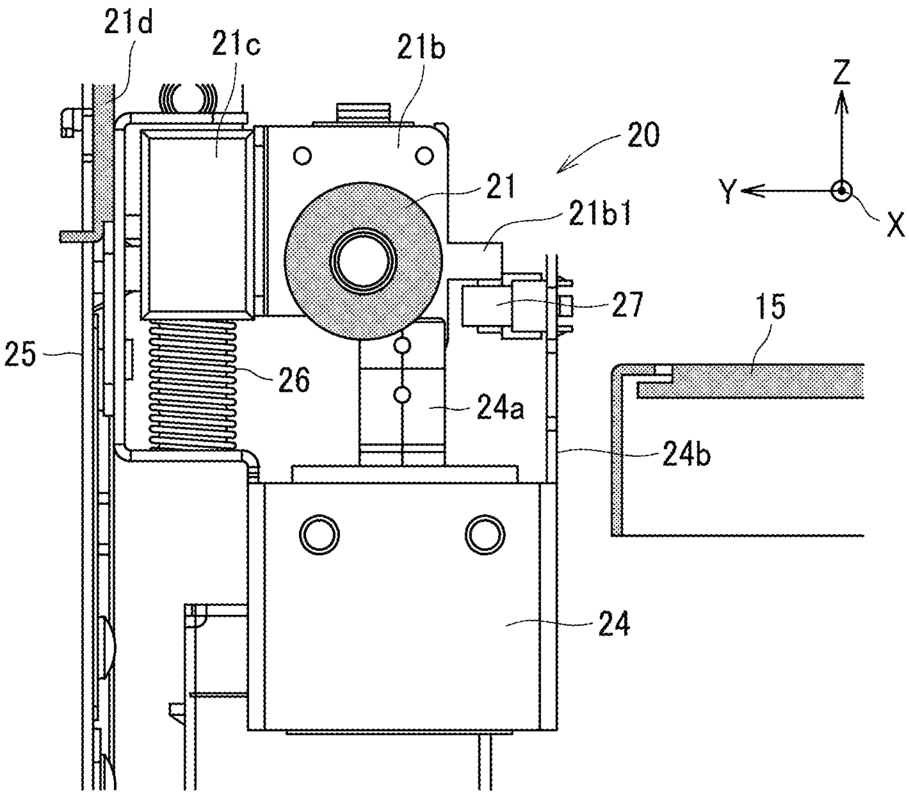
FIG. 4C is an enlarged end view of the one end of the smoother assembly of FIG. 4B.
Figure 4D:
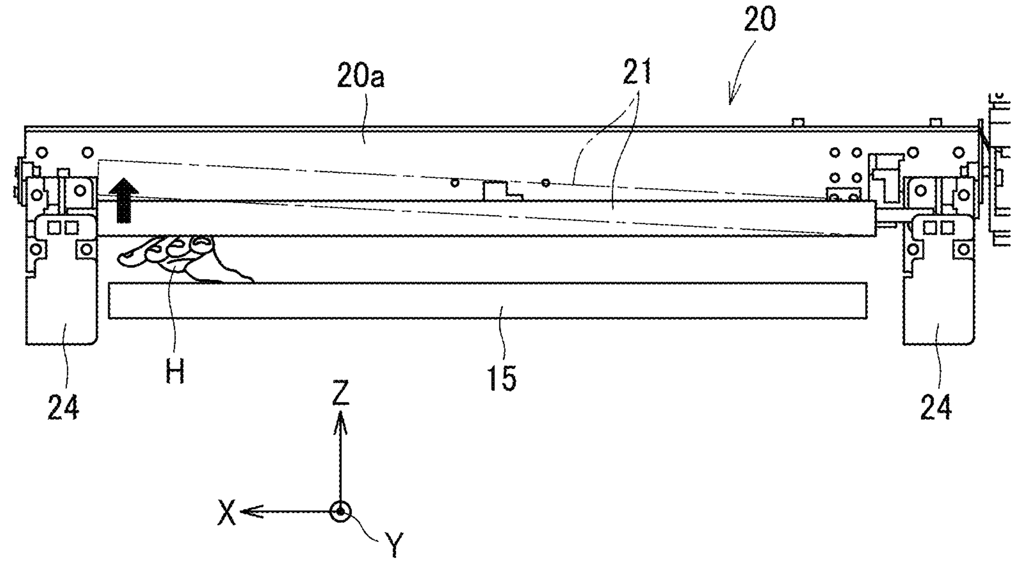
FIG. 4D is a front view of the smoother assembly of FIG. 4A.

As illustrated in FIG. 4C, the shaft support 21*h* of the smoothing roller 21 is integrated with a spring hearing 21*c* and a support plate 21*d* as a single component. The support plate 21*d* is attached to a body frame plate 25, which is a part of the body frame 20*a*, such that the support plate 21*d* is slidable in the vertical direction in FIG. 4C.

The spring bearing 21*c* is disposed to be movable in the vertical direction with the spring bearing 21*c* biased upward by a compression spring 26. An upper end of the lift shaft 24*a* of each of the electromagnetic solenoids 24 is coupled to the shaft support 21*b* of the smoothing roller 21.

When the electromagnetic solenoids 24 are turned on, the lift shafts 24*a* are pulled downward against the respective compression springs 26. Accordingly, the outer peripheral surface of the smoothing roller 21 contacts the surface of the recording medium on the holder 15. The position at which the outer peripheral surface of the smoothing roller 21 contacts the surface of the recording medium on the holder 15 is referred to as a smoothing position in the following description. The electromagnetic solenoids 24 are disposed as the pair of right and left electromagnetic solenoids. Accordingly, even if the surface of the recording medium is inclined in the X direction due to, for example, changes in the thickness of the recording medium, the outer peripheral surface of the smoothing roller 21 follows the inclination of the surface of the recording medium and contacts the surface of the recording medium without gaps. When the electromagnetic solenoids 24 are turned off, the pulling force of the lift shafts 24*a* is released. Accordingly, the spring bearings 21*c* and the shaft supports 21*b* are moved upward by the biasing force of the compression springs 26, and the outer peripheral surface of the smoothing roller 21 is separated from the recording medium. The position at which the outer peripheral surface of the smoothing roller 21 is separated from the recording medium may also be referred to simply as a non-smoothing position in the following description.

The smoothing-roller lift sensing member 22 is disposed along the smoothing roller 21 in the longitudinal direction of the smoothing roller 21. The smoothing-roller lift sensing member 22 is made of elongated sheet metal, and both ends of the smoothing-roller lift sensing member 22 in the longitudinal direction are rotatably supported by a pair of support shafts 28 as rotation shafts.

Sensing portions 22*a* are formed at both ends of the smoothing-roller lift sensing member 22. Each sensing portion 22*a* contacts a circular surface of the shaft 21*a* at corresponding one of both ends of the smoothing roller 21 in the longitudinal direction. When the sensing portions 22*a* are pushed up, the smoothing-roller lift sensing member 22 rotates about the pair of support shafts 28 clockwise in FIG. 4B.

The interlock switch 23 is disposed above one end of the smoothing-roller lift sensing member 22 in the longitudinal direction. The interlock switch 23 is used to stop the operation of the driver for moving the holder 15 in the vertical direction, i.e., the Z direction.

A pressing portion 22*b* formed at one end of the smoothing-roller lift sensing member 22 contacts an upper surface of an end of an operation plate 29, which causes the interlock switch 23 to operate. When the smoothing roller lift sensing member 22 rotates clockwise around the pair of support shafts 28 in FIG. 4B, the operation plate 29 is pressed downward by the pressing portion 22*b* and rotates counterclockwise to operate the interlock switch 23.

Operation of Liquid Discharge Apparatus

The operation of the liquid discharge apparatus 1 is described with reference to FIGS. 2A and 2B. First, a recording medium is placed on the holder 15 in an area, which may also be referred to simply as a standby position in the following description, indicated by a dotted line in FIG. 2A. Then, the holder 15 is moved in a direction indicated by arrow C1 toward the rear portion of the liquid discharge apparatus 1, i.e., an upper side in FIG. 2A.

When the rear end of the recording medium in the front-rear direction of the apparatus body 10 reaches a scanning range of the pre-treatment head 11, the holder 15 is temporarily stopped. While the holder 15 stops, the pre-treatment head 11 scans the recording medium in the X direction and applies the pre-treatment liquid onto the rear end of the recording medium.

While the holder 15 is intermittently moved to the rear portion of the liquid discharge apparatus 1, the above-described operation in which the pre-treatment head 11 scans the recording medium and applies the pre-treatment liquid is repeated. As a result, the pre-treatment liquid can be applied to the entire region of the printing area of the recording medium.

Subsequently, the holder 15 is moved in a direction indicated by arrow C2 in FIG. 2A toward the front side of the liquid discharge apparatus 1. When the front end of the recording medium on the holder 15 reaches a position below the smoother assembly 20, the holder 15 is temporarily stopped.

Subsequently, the electromagnetic solenoids 24 are turned on to operate. When the electromagnetic solenoids 24 operate, the smoothing roller 21 moves downward against the compression springs 26, and the outer peripheral surface of the smoothing roller 21 contacts the surface of the recording medium on the holder 15.

Operation of Smoothing Roller

While the outer peripheral surface of the smoothing roller 21 contacts the surface of the recording medium on the holder 15 as described above, the holder 15 is moved again in the direction indicated by arrow C2 in FIG. 2A toward the front side of the liquid discharge apparatus 1. Accordingly, the holder 15 is moved to the standby position indicated by the dotted line in FIG. 2A. In the course of the movement of the holder 15 as described above, the pre-treatment liquid that has been applied to the surface of the recording medium by the pre-treatment head 11 can be smoothed uniformly in the V direction.

At this time, the direction in which the pre-treatment liquid is applied by the pre-treatment head 11, i.e., the X direction, and the movement direction of the holder 15 and the recording medium, i.e., the Y direction, are perpendicular to each other. Accordingly, the pre-treatment liquid is uniformly applied both in the X direction and the Y direction. As a result, the print quality can be enhanced. Specifically, the enhancement of the print quality means that, in a printing operation to be described below by the print head 12, the action of the pre-treatment liquid that causes colors to appear clearly without unevenness or causes graphics or patterns to stand out without unevenness can be exerted uniformly over the entire printing area of the recording medium.

When the holder 15 is moved to the standby position indicated by the dotted line in FIG. 2A and the smoothing of the pre-treatment liquid is completed, the holder 15 is moved again in a direction indicated by arrow C3 in FIG. 2A toward the rear side of the liquid discharge apparatus 1. When the rear end of the recording medium reaches the scanning range of the print head 12, the holder 15 is temporarily stopped. While the holder 15 is temporarily stopped as described above, the print head 12 is scanned in the X direction to apply ink onto the rear end of the recording medium.

While the holder 15 is intermittently moved to the rear side of the liquid discharge apparatus 1, the scanning movement of the print head 12 and the application of ink described above are repeated. Accordingly, the ink can be applied to the entire region of the printing area of the recording medium.

In the printing area of the recording medium, the pre-treatment liquid has been smoothed uniformly in the X direction and the Y direction by the smoothing roller 21. Accordingly, the print quality can be enhanced when ink is applied onto the recording medium. When printing by the print head 12 is completed, the holder 15 is returned to the standby position indicated by the dotted line in FIG. 2A. Accordingly, the recording medium can be removed from the holder 15.

Maintenance of Liquid Discharge Apparatus

Preferably, periodic maintenance of the liquid discharge apparatus 1 is performed to maintain favorable print quality of the liquid discharge apparatus 1. Such periodic maintenance includes an operation in which, for example, the pre-treatment head 11, the print head 12, and the smoothing roller 21 are manually cleaned.

When the maintenance is performed, the holder 15 is moved to the standby position indicated by the dotted line in FIG. 2A. At the standby position, the holder 15 is lowered to a lowered position indicated by a dotted line in FIG. 2B. While the holder 15 is lowered to the lowered position as described above, as illustrated in FIG. 5, a hand H is inserted in the Y direction to clean the inside of the liquid discharge apparatus 1.

Figure 5:
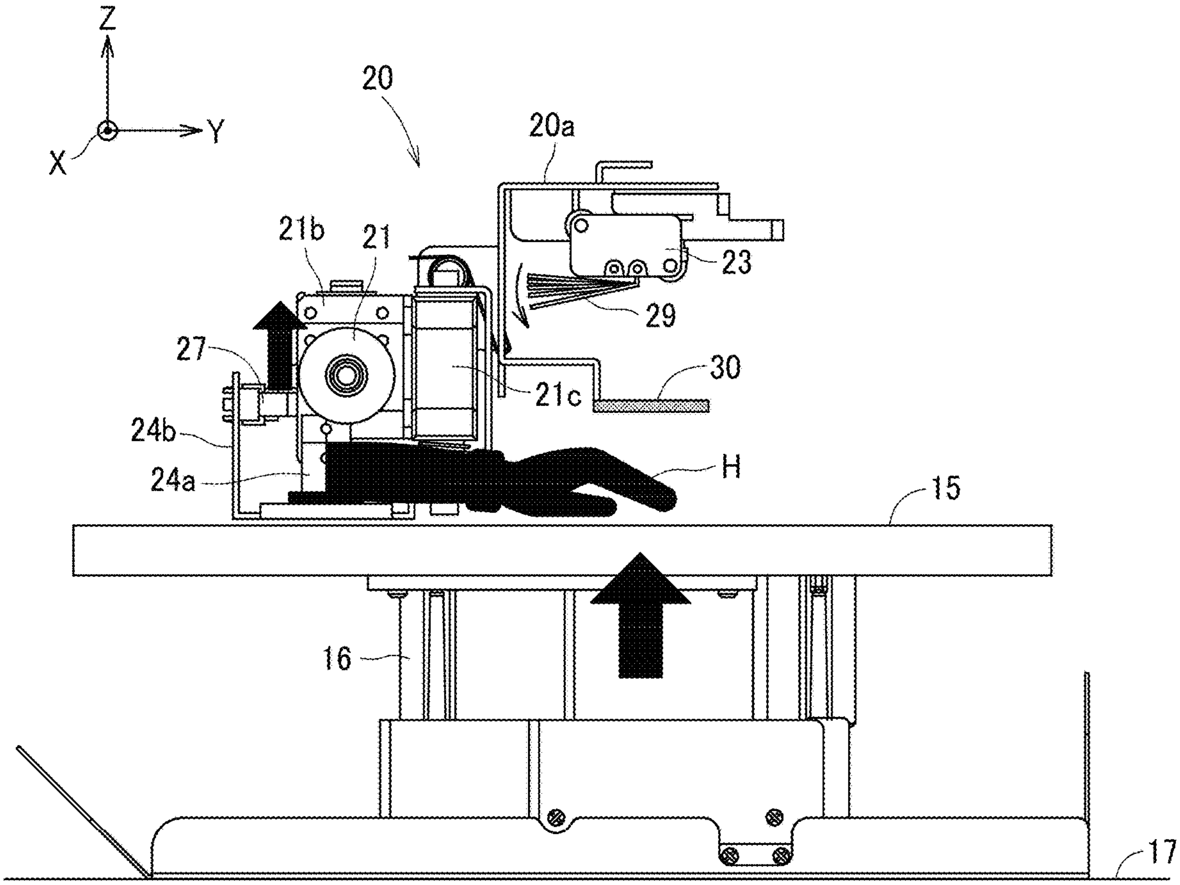
FIG. 5 is a schematic cross-sectional view of a smoother assembly and a holder for holding a recording medium in which a hand is sandwiched between the holder and a smoother, according to an embodiment of the present disclosure.

In the course of the above-described cleaning operation, if the driver of the holder 15 unexpectedly operates and the holder 15 moves upward as indicated by arrows in solid black in FIG. 5, the hand H, as an object to be caught, may be caught between the holder 15 and the smoothing roller 21. If the electromagnetic solenoids 24 are unexpectedly turned on to operate and the smoothing roller 21 is lowered, similarly to the above-described case, the hand H may be caught between the holder 15 and the smoothing roller 21. In the present embodiment, when the hand H is likely to be caught between the holder 15 and the smoothing roller 21, the driver of the holder 15 is immediately stopped by the interlock switch 23 or the electromagnetic solenoids 24 are forcibly turned off. Similarly, if the object to be caught is, for example, a cleaning tool, when the cleaning tool is likely to be caught between the holder and the smoothing roller 21, the driver of the holder 15 is immediately stopped by the interlock switch 23 or the electromagnetic solenoids 24 are forcibly turned off.

In other words, when the holder 15 is lifted and the hand H contacts the smoothing roller 21, the smoothing roller 21 is pushed up as indicated by an arrow in solid black in FIG. 4B. In such a case, the sensing portion 22*a* of the smoothing-roller lift sensing member 22 is pushed up by the shaft 21*a* of the smoothing roller 21. Accordingly, the smoothing-roller lift sensing member 22 rotates about the pair of support shafts 28 clockwise in FIG. 4B. Conversely, when the smoothing roller 21 is lowered, the smoothing-roller lift sensing member 22 rotates about the pair of support shafts 28 counterclockwise in FIG. 4B.

When the smoothing-roller lift sensing member 22 rotates about the pair of support shafts 28 counterclockwise in FIG. 4B as described above, the operation plate 29 is pressed downward by the pressing portion 22*b* to rotate counterclockwise. Accordingly, the interlock switch 23 is operated. Operating the interlock switch 23 as described above causes the driver of the holder 15 to stop or the electromagnetic solenoids 24 to be forcibly turned off. The interlock switch 23 directly cuts off the power supply of the motor of the driver of the holder 15 or forcibly turns off the electromagnetic solenoids 24 and no software is involved. Thus, it is not necessary to consider the runaway of the software. As a result, the machine can be safely stopped.

It cannot be predicted at which position the hand H is inserted in the left-right direction of the liquid discharge apparatus 1 between the holder 15 and the smoothing roller 21. Even when the hand H is inserted at any position in the left-right direction between the holder 15 and the smoothing roller 21, preferably, the interlock switch 23 operates reliably.

For this reason, in the present embodiment, both ends of the smoothing-roller lift sensing member 22 are supported by the pair of support shafts 28. Accordingly, even if at least one of a left-end and a right-end of the shaft 21*a* of the smoothing roller 21 is pushed up, at least one of the left and right sensing portions 22*a* is pushed up such that the smoothing-roller lift sensing member 22 is reliably rotated. Accordingly, the interlock switch 23 is reliably operated.

Modification of Liquid Discharge Apparatus

Figure 6:
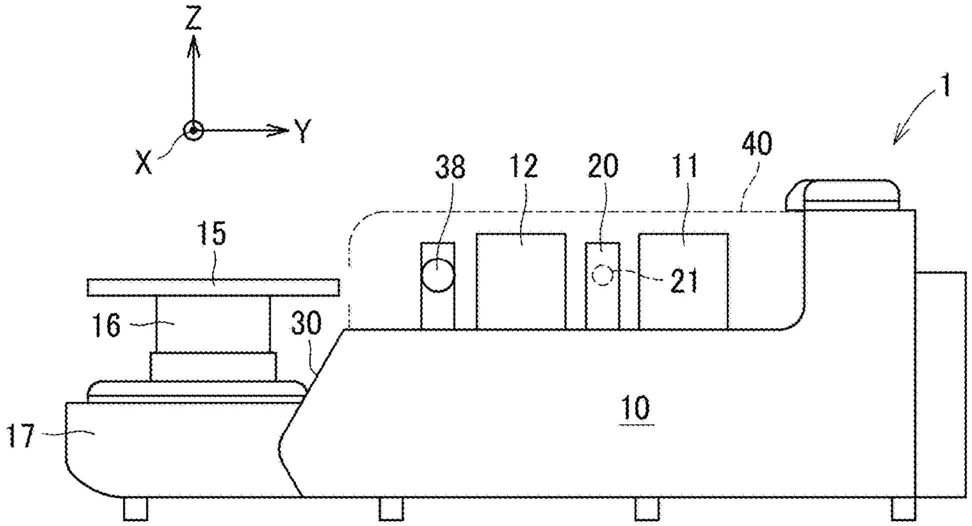
FIG. 6 is a side view of a liquid discharge apparatus according to a modification of the above embodiments of the present disclosure.

FIG. 6 is a side view of the liquid discharge apparatus 1 according to a modification of the above embodiments of the present disclosure. In the liquid discharge apparatus 1 according to the present modification, the position of the smoother assembly 20 is changed from the position of the smoother assembly 20 of the above-described embodiments. In other words, in the liquid discharge apparatus 1 of FIG. 3, the smoother assembly 20 is disposed in the front portion of the liquid discharge apparatus 1 such that the maintenance operation may be easily performed. However, in the liquid discharge apparatus 1 of FIG. 6 according to the present modification, the smoother assembly 20 is disposed between the pre-treatment head 11 and the print head 12.

The smoother assembly 20 is disposed between the pre-treatment head 11 and the print head 12 as described above. Accordingly, the number of times in which the holder 15 is moved to switch among the directions C1, C2, and C3 illustrated in FIG. 2A, can be reduced. In other words, in the above embodiment of the present embodiment described with reference to FIG. 2A, the holder 15 is to be moved three times from the front side to the rear side in the direction C1, from the rear side to the front side in the direction C2, and from the front side to the rear side of the liquid discharge apparatus 1 in the direction C3. By contrast, in the liquid discharge apparatus 1 according to the modification of FIG. 6, the application of the pre-treatment liquid, smoothing of the pre-treatment liquid, and printing can be completed only by moving the holder 15 twice from the rear side to the front side and from the front side to the rear side of the liquid discharge apparatus 1. Thus, the application of the pre-treatment liquid, smoothing of the pre-treatment liquid, and printing can be performed efficiently.

When the holder 15 is moved to the rear side of the liquid discharge apparatus 1, the holder 15 is moved until the front end of the recording medium reaches the scanning range of the pre-treatment head 11. Subsequently, while the holder 15 is intermittently moved to the front side of the liquid discharge apparatus 1, scanning of the pre-treatment head 11 and application of the pre-treatment liquid by the pre-treatment head 11, smoothing of the pre-treatment liquid by the smoothing roller 21, and printing by the print head 12 are sequentially performed in the order listed.

Height Sensor and Related Components

In FIGS. 3 and 6, a height sensor 38 is illustrated. The height sensor 38 detects whether the surface of the recording medium is positioned at a height at which the recording medium does not interfere with the pre-treatment head 11 or the print head 12 when the recording medium is moved to the rear side of the liquid discharge apparatus 1. When the height at which the surface of the recording medium is positioned exceeds a predetermined height, printing is stopped.

In FIGS. 3 and 6, a cover 40 of the liquid discharge apparatus 1 is illustrated with a dotted line. The cover 40 is opened as illustrated in FIG. 1. By so doing, maintenance of the inside of the liquid discharge apparatus 1 can be performed.

Smoothing Roller According to a First Modification

Figure 7A:
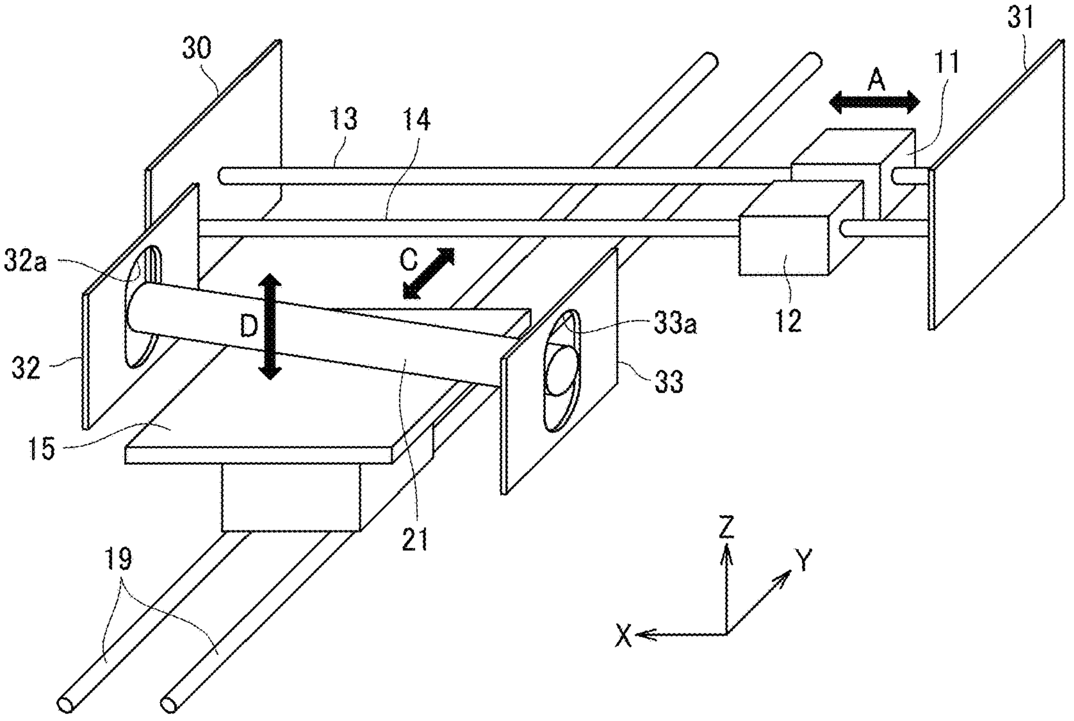
FIG. 7A is a perspective view of a smoothing roller and related components according to a first modification of the above embodiments of the present disclosure.
Figure 7B:
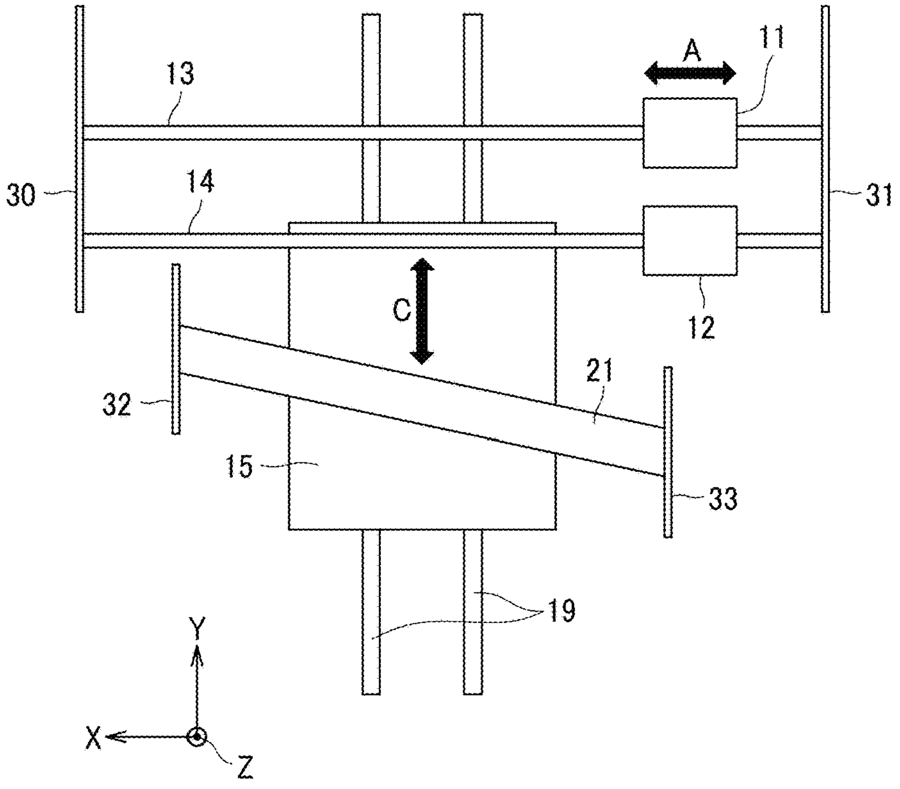
FIG. 7B is a plan view of the smoothing roller and the related components of FIG. 7A.

FIG. 7A is a perspective view of the smoothing roller 21 and related components according to a first modification of the above embodiments of the present disclosure. FIG. 7B is a plan view of the smoothing roller 21 and the related components according to the first modification of FIG. 7A. In the first modification of the above embodiments of the present disclosure, the smoothing roller 21 is disposed in a direction, which may also be referred to simply as a second direction in the following description, inclined with respect to the Y direction, i.e., the first direction, in other words, the smoothing roller 21 is disposed in the direction inclined with respect to the guide rails 13, 14 and 19 in an X-Y plane. Both ends of the guide rails 13 and 14 that movably support the pre-treatment head H and the print head 12, respectively, are supported by a pair of left and right side plates 30 and 31.

Both ends of the smoothing roller 21 are supported by a pair of smoothing-roller holders 32 and 33 arranged in the second direction. The smoothing-roller holders 32 and 33 can be formed of plate-shaped members parallel to each other.

The smoothing-roller holders 32 and 33 include vertical guide holes 32*a* and 33*a*, respectively, that guide both ends of the smoothing roller 21 such that both ends of the smoothing roller 21 are movable in the vertical direction. Both ends of the smoothing roller 21 are movable along the vertical guide holes 32*a* and 33*a* in the vertical direction, i.e., in directions indicated by arrow D in FIG. 7A. When the holder 15 is moved in directions indicated by arrow C with the smoothing roller 21 lowered to contact the surface of the recording medium, the pre-treatment liquid that has been applied to the surface of the recording medium on the holder 15 by the pre-treatment head 11 can be uniformly smoothed in the Y direction.

Smoothing Roller According to a Second Modification

Figure 8A:
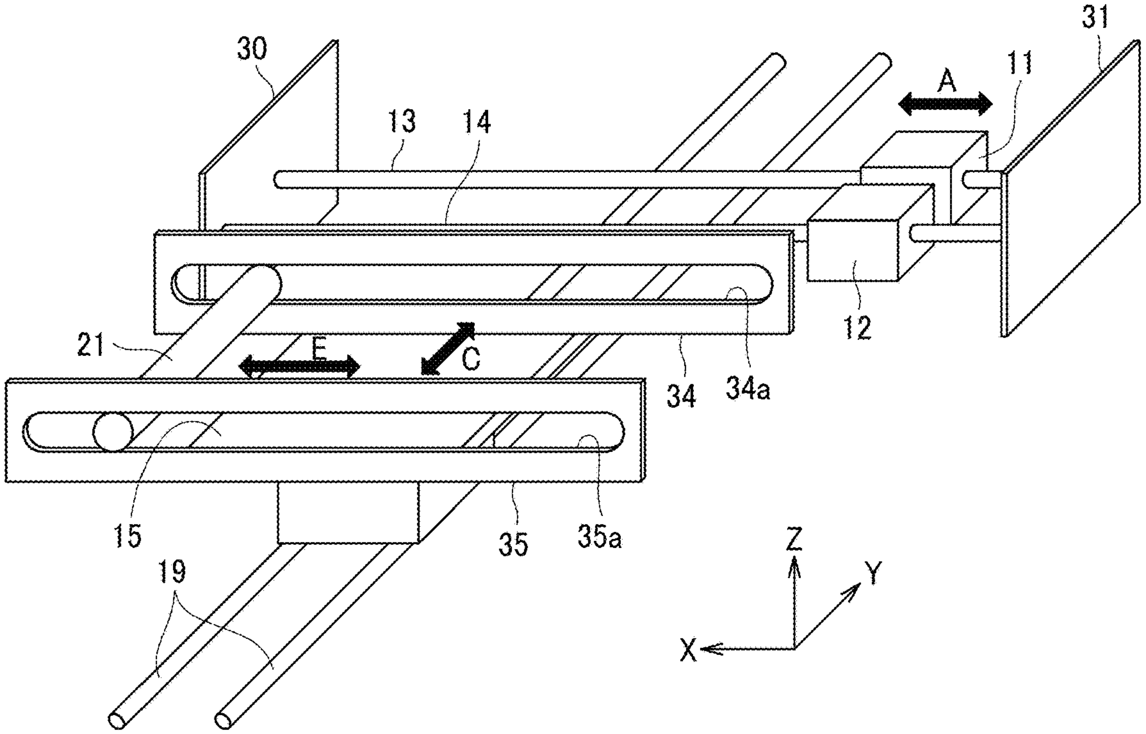
FIG. 8A is a perspective view of a smoothing roller and related components according to a second modification of the above embodiments of the present disclosure.
Figure 8B:
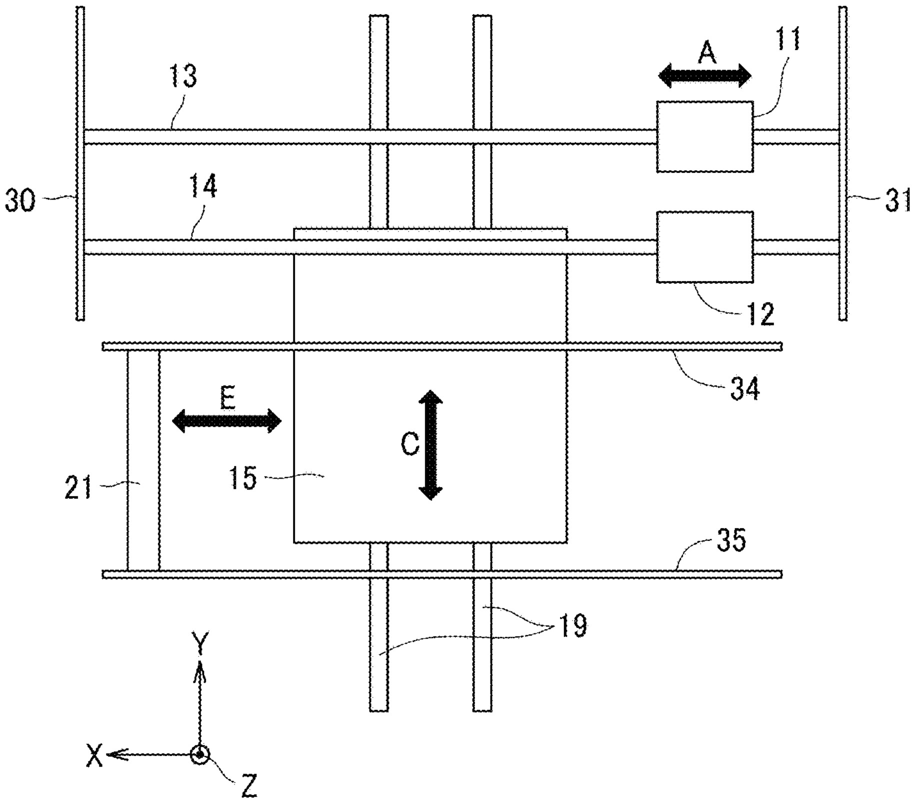
FIG. 8B is a plan view of the smoothing roller and the related components according to the second modification of FIG. 8A.

FIG. 8A is a perspective view of the smoothing roller 21 and related components according to a second modification of the above embodiments of the present disclosure. FIG. 8B is a plan view of the smoothing roller 21 and the related components according to the second modification of FIG. 8A. In the second modification of the above embodiments of the present disclosure, the smoothing roller 21 is disposed in a direction, i.e., the second direction, parallel to the Y direction, i.e., the first direction. Both ends of the guide rails 13 and 14 that movably support the pre-treatment head 11 and the print head 12, respectively, are supported by the pair of left and right side plates 30 and 31.

Both ends of the smoothing roller 21 are supported by a pair of smoothing-roller holders 34 and 35 disposed at a front position and a rear position, respectively, in the Y direction. The smoothing-roller holders 34 and 35 can be formed of plate-shaped members parallel to each other.

The smoothing-roller holders 34 and 35 include guide lateral holes 34*a* and 35*a*, respectively, that guide both ends of the smoothing roller 21 such that both ends of the smoothing roller 21 are horizontally movable. The smoothing roller 21 is reciprocally movable in directions indicated by arrow E, i.e., directions parallel to the X direction, along the guide lateral holes 34*a* and 35*a*.

The smoothing roller 21 is moved in the directions indicated by arrow E. By so doing, the pre-treatment liquid, which has been applied to the surface of the recording medium on the holder 15 by the pre-treatment head 11, can be smoothed uniformly in the X direction. As described above in the first and second modifications of the above embodiments of the present disclosure, the smoothing roller 21 may be disposed in a direction other than the X direction, i.e., the second direction, perpendicular to the Y direction, i.e., the first direction.

The following describes preferred aspects of the present disclosure.

First Aspect

A liquid discharge apparatus includes a holder to reciprocally move while holding a recording medium, a pre-treatment head to discharge a pre-treatment liquid onto a surface of the recording medium held by the holder, a smoother to smooth the pre-treatment liquid, which is discharged onto the surface of the recording medium, along the surface of the recording medium by a movement of the holder, and a print head to discharge a printing liquid onto the surface of the recording medium with the pre-treatment liquid smoothed.

Second Aspect

In the liquid discharge apparatus according to the first aspect of the present disclosure, the smoother is disposed to be vertically movable by a lifter between a smoothing position at which the smoother contacts the pre-treatment liquid on the surface of the recording medium and a non-smoothing position at which the smoother does not contact the pre-treatment liquid.

Third Aspect

In the liquid discharge apparatus according to the first aspect or the second aspect of the present disclosure, the holder is disposed to be vertically movable by another lifter between a lifted position at which the pre-treatment liquid or the printing liquid is discharged onto the surface of the recording medium and a lowered position at which the pre-treatment liquid or the printing liquid is not discharged onto the surface of the recording medium.

Fourth Aspect

The liquid discharge apparatus according to the third aspect of the present disclosure further includes an interlock switch to be used for the other lifter. In the liquid discharge apparatus according to the third aspect of the present disclosure, when the smoother is lifted by the other lifter with an object caught between the holder and smoother, the smoother is pushed up by the object, to operate the interlock switch for the other lifter to stop the holder when the smoother is pushed up.

Fifth Aspect

In the liquid discharge apparatus according to any one of the second aspect to the fourth aspect of the present disclosure, the smoother is disposed such that both ends of the smoother in the longitudinal direction are vertically movable by the lifter.

Sixth Aspect

The liquid discharge apparatus according to the fourth aspect of the present disclosure further includes a lift sensing member above the smoother, and the interlock switch operates via the lift sensing member when the smoother is pushed up by the object to be caught.

Seventh Aspect

In the liquid discharge apparatus according to any one of the first aspect to the sixth aspect of the present disclosure, the holder is disposed to be reciprocally movable in a first direction, and the smoother is disposed in a second direction perpendicular to the first direction.

Eighth Aspect

In the liquid discharge apparatus according to any one of the first aspect to the sixth aspect of the present disclosure, the holder is disposed to be reciprocally movable in a first direction, and the smoother is disposed in a second direction inclined with respect to the first direction.

Ninth Aspect

In the liquid discharge apparatus according to any one of the first aspect to the sixth aspect of the present disclosure, the holder is disposed to be reciprocally movable in a first direction, and the smoother is disposed in a second direction parallel to the first direction and is disposed to be reciprocally movable in a direction perpendicular to the first direction.

Tenth Aspect

In the liquid discharge apparatus according to the sixth aspect of the present disclosure, the holder is disposed to reciprocally move in a first direction, and the smoother extends in a second direction perpendicular to the first direction. The lift sensing member includes a plurality of sensing portions at longitudinal ends of the lift sensing member, to contact upper surfaces of the smoother at longitudinal ends of the smoother. The lift sensing member extends in the second direction, Eleventh Aspect In the liquid discharge apparatus according to the sixth aspect of the present disclosure, the lift sensing member is rotatably supported by rotation shafts at both ends of the lift sensing member in the longitudinal direction. The lift sensing member rotates to cause the interlock switch to operate when the smoother is pushed up by an object caught between the holder and the smoother.

Twelfth Aspect

In the liquid discharge apparatus according to any one of the first aspect to the eleventh aspect of the present disclosure, the smoother, the print head, and the pre-treatment head are sequentially disposed in the order listed from an upstream side to a downstream side in a direction in which the holder moves toward a rear side of the liquid discharge apparatus.

Thirteenth Aspect

The liquid discharge apparatus according to the twelfth aspect of the present disclosure further includes a height sensor to detect a height of the surface of the recording medium. The height sensor is disposed between the smoother and the print head.

Fourteenth Aspect

In the liquid discharge apparatus according to any one of the first aspect to the eleventh aspect of the present disclosure, the print head, the smoother, and the pre-treatment head are sequentially disposed in the order listed from an upstream side to a downstream side in a direction in which the holder moves toward a rear side of the liquid discharge apparatus.

Fifteenth Aspect

The liquid discharge apparatus according to the fourteenth aspect of the present disclosure further includes a height sensor to detect a height of the surface of the recording medium. The height sensor is disposed upstream from the print head in the direction in which the holder moves toward the rear side of the liquid discharge apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:

a holder to reciprocally move while holding a recording medium, a pre-treatment head to discharge a pre-treatment liquid onto a surface of the recording medium held by the holder, a smoother to smooth the pre-treatment liquid, which is discharged onto the surface of the recording medium, along the surface of the recording medium by a movement of the holder, a print head to discharge a printing liquid onto the surface of the recording medium with the pre-treatment liquid smoothed, a lifter to vertically move the holder between a lifted position at which the pre-treatment liquid or the printing liquid is discharged onto the surface of the recording medium and a lowered position at which the pre-treatment liquid or the printing liquid is not discharged onto the surface of the recording medium, an interlock switch for the lifter, and wherein when the smoother is lifted by the lifter with an object caught between the holder and the smoother, the smoother is pushed up by the object to operate the interlock switch to stop the holder.

2. The liquid discharge apparatus according to claim 1, further comprising:

a second lifter to vertically move the smoother between a smoothing position at which the smoother contacts the pre-treatment liquid on the surface of the recording medium and a non-smoothing position at which the smoother does not contact the pre-treatment liquid.

3. The liquid discharge apparatus according to claim 2, wherein;

the smoother is disposed such that longitudinal ends of the smoother are vertically movable by the second lifter.

4. The liquid discharge apparatus according to claim 1, further comprising:

a lift sensor above the smoother, wherein the interlock switch operates via the lift sensor when the smoother is pushed up by the object to be caught.

5. The liquid discharge apparatus according to claim 4, wherein:

the holder is disposed to reciprocally move in a first direction, and the smoother extends in a second direction perpendicular to the first direction, the lift sensor includes a plurality of sensing portions at longitudinal ends of the lift sensor, to contact upper surfaces of the smoother at longitudinal ends of the smoother, and the lift sensor extends in the second direction.

6. The liquid discharge apparatus according to claim 4, wherein:

the lift sensor is rotatably supported by rotation shafts at longitudinal ends of the lift sensor, and the lift sensor rotates to cause the interlock switch to operate when the smoother is pushed up by an object caught between the holder and the smoother.

7. The liquid discharge apparatus according to claim 1, wherein:

the holder is disposed to reciprocally move in a first direction, and the smoother extends in a second direction perpendicular to the first direction.

8. The liquid discharge apparatus according to claim 1, wherein:

the holder is disposed to reciprocally move in a first direction, and the smoother extends in a second direction inclined with respect to the first direction.

9. The liquid discharge apparatus according to claim 1, wherein:

the holder is disposed to reciprocally move in a first direction, and the smoother extends in a second direction parallel to the first direction and is disposed to reciprocally move in a direction perpendicular to the first direction.

10. A liquid discharge apparatus, comprising:

a holder to reciprocally move while holding a recording medium, a pre-treatment head to discharge a pre-treatment liquid onto a surface of the recording medium held by the holder, a smoother to smooth the pre-treatment liquid, which is discharged onto the surface of the recording medium, along the surface of the recording medium by a movement of the holder, and a print head to discharge a printing liquid onto the surface of the recording medium with the pre-treatment liquid smoothed, wherein the smoother, the print head, and the pre-treatment head are sequentially disposed in an order of the smoother, the print head, and the pre-treatment head from an upstream side to a downstream side in a direction in which the holder moves toward a rear side of the liquid discharge apparatus.

11. The liquid discharge apparatus according to claim 10, further comprising:

a height sensor to detect a height of the surface of the recording medium, wherein the height sensor is disposed between the smoother and the print head.

12. The liquid discharge apparatus according to claim 10, further comprising:

a lifter to vertically move the smoother between a smoothing position at which the smoother contacts the pre-treatment liquid on the surface of the recording medium and a non-smoothing position at which the smoother does not contact the pre-treatment liquid.

13. The liquid discharge apparatus according to claim 12, wherein:

the smoother is disposed such that longitudinal ends of the smoother are vertically movable by the second lifter.

14. The liquid discharge apparatus according to claim 10, wherein:

the holder is disposed to reciprocally move in a first direction, and the smoother extends in a second direction perpendicular to the first direction.

15. The liquid discharge apparatus according to claim 10, wherein:

the holder is disposed to reciprocally move in a first direction, and the smoother extends in a second direction inclined with respect to the first direction.

16. A liquid discharge apparatus, comprising:

a holder to reciprocally move while holding a recording medium, a pre-treatment head to discharge a pre-treatment liquid onto a surface of the recording medium held by the holder, a smoother to smooth the pre-treatment liquid, which is discharged onto the surface of the recording medium, along the surface of the recording medium by a movement of the holder, and a print head to discharge a printing liquid onto the surface of the recording medium with the pre-treatment liquid smoothed, wherein the print head, the smoother, and the pre-treatment head are sequentially disposed in an order of the print head, the smoother, and the pre-treatment head from an upstream side to a downstream side in a direction in which the holder moves toward a rear side of the liquid discharge apparatus.

17. The liquid discharge apparatus according to claim 16, further comprising:

a height sensor to detect a height of the surface of the recording medium, wherein the height sensor is disposed upstream from the print head in the direction in which the holder moves toward the rear side of the liquid discharge apparatus.

18. The liquid discharge apparatus according to claim 16, further comprising:

a lifter to vertically move the smoother between a smoothing position at which the smoother contacts the pre-treatment liquid on the surface of the recording medium and a non-smoothing position at which the smoother does not contact the pre-treatment liquid.

19. The liquid discharge apparatus according to claim 18, wherein:

the smoother is disposed such that longitudinal ends of the smoother are vertically movable by the second lifter.

20. The liquid discharge apparatus according to claim 16, wherein:

the holder is disposed to reciprocally move in a first direction, and the smoother extends in a second direction perpendicular to the first direction.

* * * * *